United States Patent [19]
Mertz

[11] Patent Number: 5,312,243
[45] Date of Patent: May 17, 1994

[54] SLIDE RETAINER FOR AN INJECTION MOLD

[76] Inventor: James E. Mertz, 735 Concord St., Algonquin, Ill. 60102-2134

[21] Appl. No.: 861,656

[22] Filed: Apr. 1, 1992

[51] Int. Cl.[5] .......................................... B29C 45/44
[52] U.S. Cl. .................................... 425/577; 249/64; 249/68; 264/318; 425/DIG. 58
[58] Field of Search ................ 425/577, 595, DIG. 5, 425/DIG. 58; 249/64, 68; 264/318

[56] References Cited

U.S. PATENT DOCUMENTS

| | | | |
|---|---|---|---|
| 3,811,645 | 5/1974 | Feist | 249/68 |
| 4,765,585 | 8/1988 | Weider | 249/68 |
| 4,768,747 | 9/1988 | Williams et al. | 425/DIG. 5 |
| 4,998,875 | 3/1991 | Starkey | 425/577 |

*Primary Examiner*—Tim Heitbrink
*Attorney, Agent, or Firm*—Maksymonko & Slater

[57] ABSTRACT

A slide retainer for an injection mold tool with positive locking, recessed mounting, and guide bar capabilities. The retainer includes a track channel insert rigidly mounted in the base plate of an injection mold tool and a cooperating cylindrical insert mounted for rotational movement in the slide. The channel insert may be extended outwardly from the base plate to serve secondarily as the slide guide bar. The cylindrical insert includes an eccentrically mounted track pin and a torsional spring thereby biasing the track pin for rotation movement. The channel insert includes a circumferential heart-shaped channel that defines an island in the middle thereof. The track pin extends into the channel and traverses the circumferential path once during each mold cycle. A unidirection flapper gate is provided to route the pin through the channel in the proper direction. Slide retention and locking are achieved when the track pin is oriented in the indented portion at the top of the heart-shaped channel. Channel facilitate slide removal without tool disassembly.

10 Claims, 3 Drawing Sheets

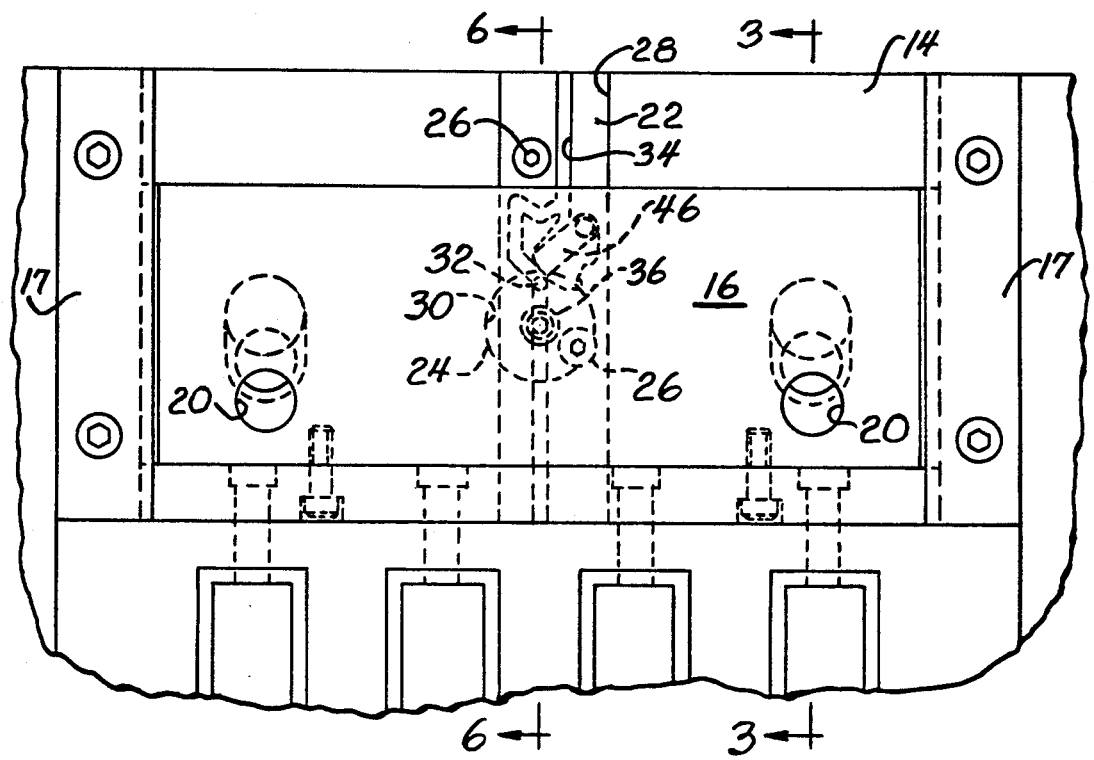
FIG.1
FIG.2
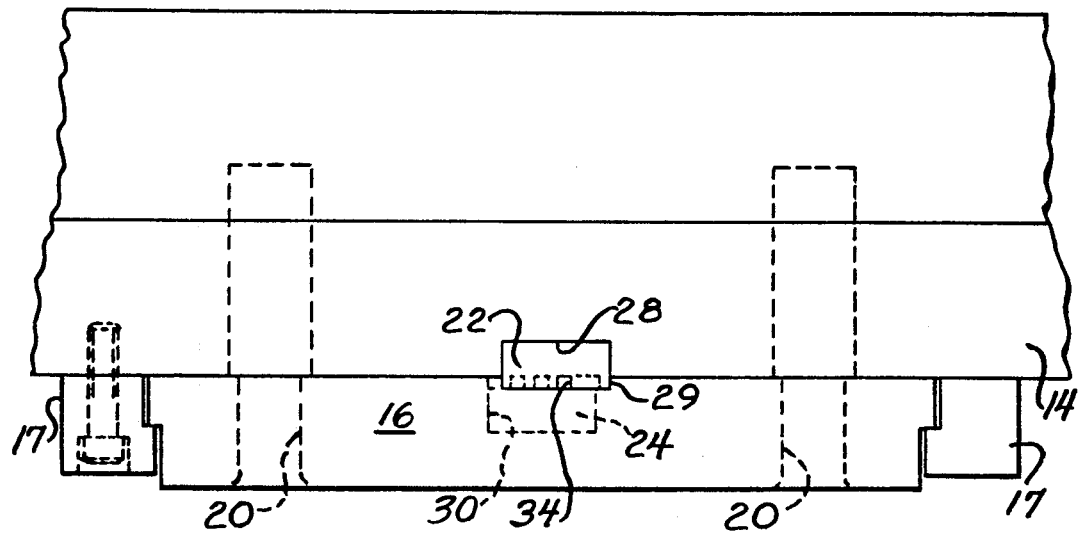

SLIDE RETAINER FOR AN INJECTION MOLD

BACKGROUND OF THE INVENTION

The present invention relates to tooling for use in connection with, for example, injection molding, and more specifically to retaining mechanisms employed to restrain and lock tooling core pieces in their retracted position when the mold is open.

Injection mold tools are generally defined by a pair of mold members or die halves which part to expose and effect release of the molded piece part contained within the mold. For non-complicated parts, the mold tool members are simply separated with the molded component being pushed outwardly from the mold member in which it rests. For a large percentage of molds, however, piece geometry requires use of tool core members which must be withdrawn laterally, i.e. parallel to the parting plane separating the mold halves, from the molded part before that part can be released from the mold. These core members are designed to automatically cycle between retracted and inserted positions as the mold halves are correspondingly reciprocated between respective parted (i.e. part release) and mated (i.e. part mold) positions.

More specifically, the core members are affixed to movable portions of the tool commonly known as slides. As noted, a slide must be advanced to properly position the core member within the mold for part fabrication and thereafter retracted to facilitate part release. The present invention relates to mechanisms, known as retainers, employed to hold the slide in its retracted position while the mold is open.

Not all slides require retainers. Gravity, for example, may serve the retainer function for slides positioned below the tool die. However, many tools require multiple core members thereby necessitating placement of slides laterally or above the mold die. It is critical that these slides remain securely positioned in their retracted positions until the next recycled closure of the mold. Should the slide be misplaced during die closure, substantial damage or destruction of the mold may occur. Machined tool molds represent expensive investments, not uncommonly exceeding tens or hundreds of thousands of dollars.

Slide retainers are not new. Several well-known designs are commercially available. As set forth in more detail herein, the present slide retainer offers several important advantages over these known designs including the very important feature of guaranteed slide retention.

A principal limitation of currently available slide retainers is the absence of a positive lock against inadvertent slide release. Each of the prior art structures employs spring-loaded jaws or cams or, in one known device, simply the clasping pressure afforded by elastically deforming plastic material to grip and retain the core slide. But each of these retention schemes has, in the first instance, a relatively low finite slide-holding potential or limit and, furthermore, the not-insignificant possibility of complete retention failure due to fatigue occasioned by the long-term cycling of the linear compression springs therein or, in the case of the elastically deformed plastic retainer, simple wearing of the plastic.

But it is the relatively low and finite overall load limit of these devices that represents one of their most significant shortcomings. These retainers, even if properly maintained and replaced according to manufacturers recommendations, can still cause the disastrous release of the core slide members due, as above noted, to the finite load limits thereof. The present retainer, by contrast, offers among other advantages a positive locking feature that virtually guarantees against unscheduled slide movement.

One well-known slide retainer is described in U.S. Pat. No. 3,811,645 to Feist. This retainer is typically mounted on the movable base member of the tooling die and defines a pair of spring-loaded jaws into which a pin, extending from the slide member, is received as the slide is urged, for example upwardly, to its fully core-retracted position. The jaws clamp the pin thereby, at least in theory, precluding its release and downward return into the die. There is nothing to foreclose the release of the slide other than the limited grasping ability of the spring-loaded jaws themselves. Indeed, upon tool closure the slide retention pin is forced—against this spring pressure—out of engagement within the locking jaws.

While such spring-loaded locking jaws are designed to hold specified slide weights, unexpected roughness (i.e. bumping or jerking) of the molding press or, even more likely, the inadvertent bumping of the slide by persons servicing the press, has been known to result in slide release. By contrast, the slide retainer described herein positively receives and positions the slide pin within a machined channel and behind a solid island of material thereby locking the slide against inadvertent release in the face of any conceivable load placed thereon. And, as previously noted, linear compression springs of the type shown by Feist are known to fatigue and fail if subjected to prolonged use and therefore must be periodically replaced to minimize the likelihood of retainer failure.

A further disadvantage of the Feist-type retainer overcome by the present invention is that related to the mounting thereof. Feist retainers are customarily affixed to the movable mold base above—in the case of a vertically retracting slide—the maximum upward travel thereof. As these retainers require between 1½ to 3½ inches of "real estate" for proper attachment, the mold base upon which the retainer is to be placed must be correspondingly larger. the added size of the required tool base—which is comprised of notoriously expensive machine grade steel—can significantly increase the overall cost of the associated completed tool. A further difficulty with the Feist retainer is its mounting orientation—outwardly of the slide and along the moving axis thereof—necessarily precludes the removal of the slide without, first, either removing the retainer or the slide attachment rails.

By contrast, the present retainer is positioned within the base and below the path of slide travel. In this manner, neither increased base volume is required to mount the retainer nor must the retainer be removed prior to removal of the slide.

A similar retainer to that of Feist is the urethane clip described in U.S. Pat. No. 4,998,875. This retainer uses the resiliency or elasticity of the plastic material to effect slide pin capture and locking. But this retainer suffers the same limitations noted above in its mounting and restricted grasping power and in its corresponding absence of any positive slide locking mechanism. Furthermore, while such retainer will not exhibit spring failure, normal wear of the urethane material is viewed as significantly limiting the cycle life of this device.

Yet another known retainer is described in U.S. Pat. No. 4,765,585. This retainer employs a linear spring-loaded plunger or ram—generally mounted to the base—that seats within a mating slotted holder on the slide. This arrangement exhibits many of the above-discussed limitations including limited holding power; the likelihood of linear spring fatigue-induced failure; and the absence of a positive locking mechanism to preclude inadvertent slide release.

As yet a further advantage of the present retainer is its dual-functionality as, foremostly, a positive-locking slide retainer but, secondarily, as a mechanism for properly guiding the associated slide. It is well known that slide guide bars are utilized in most high quality tooling to assure proper and repeatable tracking and positioning of the slide and associated tool core member. As set forth in more detail below, the present retainer may advantageously be configured to effect the secondary, but important, function of slide guiding thereby obviating the expense associated with the addition of conventional slide guide bar arrangements.

The above-noted features of the present slide retainer are achieved through the cooperation of track channel and cylindrical pin inserts mounted, respectively, within the so-called "B" plate of the movable half of the mold and the movable slide. Importantly, both inserts are retained largely within their respective base and slide members, i.e. do not protrude beyond the plane defined therebetween, and therefore do not require removal of either slide component to effect removal of the slide, itself. The track channel, however, may extend into operative engagement with the slide thereby providing the above-described slide guide function. Further, the track insert is positioned within the base generally below or adjacent the ordinary path of slide travel thereby employing portions of the mold base that are ordinarily present and otherwise required for proper tool design and slide operation. In this manner, proper slide retention is achieved without a corresponding increase in the size of the tool base material required.

Actual slide retention is effected through the engagement of a track pin, which pin extends from the cylindrical insert within the slide, across the previously noted plane defined between the slide and base, into a channel defined within the base track insert. Effortless slide removal (i.e. without first removing portions of the retainer or slide rails) is not compromised, however. Ingress/egress channels are provided at the longitudinally opposed ends of the track insert to facilitate this ease of removal.

The track channel defines a "one-way" circumferential course through which the mating track pin navigates during each cycle of the tool. Such uni-directional travel is achieved through the combination of a rotationally biased pin assembly and a uni-directional gate within the channel itself. More specifically, the track pin is rigidly and asymmetrically mounted to the cylindrical insert, the latter member being retained for rotational movement within a corresponding cylindrical slide bore. A torsional spring biases the cylindrical insert for rotation in a predetermined angular direction.

As the slide is retracted following each mold cycle, the track pin enters the circumferential channel being routed in the proper direction through this channel by reason of the previously noted gate. A second torsional spring maintains this gate in a closed position thereby inhibiting pin passage other than in the prescribed direction. It is significant that each of the above-noted springs is of torsional configuration. Such springs, when operated within restricted angular limits as herein, exhibit a substantially unlimited life expectancy thereby eliminating the probability of failure found in retainers employing linear springs.

As the slide reaches its maximum retracted position—a positioned defined by one or more generally conventional angle pins extending from the stationary half of the mold into a mating slide holes—the track pin, under the force of its torsional biasing spring, rotates and, traveling within a substantially lateral region of the track channel, firmly seats within a recess or indentation defined in the channel. This indented, lateral portion of the track channel is heart-shaped—the entire channel dipping at the point of indentation. This dip forms, not only the recess into which the track pin seats, but an opposed channel wall that precludes the continued movement of the track pin through the track channel. Thus, further rotation of the track pin and insert is inhibited until the slide is again engaged by the angle pins upon commencement of the next mold cycle.

A significant feature of the above-described topology is the positive locking achieved thereby. When received within the recessed portion of the track channel, a solid barrier or island of machine steel defined by the track channel wall, absolutely forecloses further movement of the track pin in the release direction, i.e. movement of the slide into the mold. The slide cannot be moved or released regardless of the weight of the slide, the vibration or other roughness of machine operation, or, the inadvertent pressure placed on the slide by persons working on the mold.

Release of the slide occurs only upon commencement of the next mold cycle, more specifically, upon re-entry of the angle pins into the mating holes within the slide. As the beveled end regions of the pins first engage the slide, the slide is forced a small additional distance upwardly thereby lifting the track pin from the track channel recess. Once released from the channel recess, the track pin continues its one-way journey to the end of the lateral portion of the track channel, again, under the rotational force of the spring-biased cylindrical insert.

The track pin is now free to travel downwardly through the remainder of the one-way circumferential channel, under the engagement and urging of the angle pins until it returns to the initial mold position. In completing this movement, the track pin must pass the gate, which uni-directional gate yields to the passage of the track pin in the prescribed return direction.

It is therefore an object of the present invention to provide a slide retainer. The retainer should preferably accommodate a wide range of slide weights and should incorporate positive locking against inadvertent slide release.

A further object of the present invention is a slide retainer that may be affixed to and within the slide and mold base without requiring additional mold base material beyond that otherwise required to implement the desired mold tooling configuration.

Yet another object of the present slide retainer is the elimination of discrete slide guide bars through providing for an integral slide retainer guiding structure.

These and other objects will become apparent from the Drawings and the specification including the Description of the Preferred Embodiment that follow.

BRIEF DESCRIPTION OF THE DRAWINGS

FIG. 1 is a front elevation view showing an injection mold tool containing a slide and the slide retainer of the present invention;

FIG. 2 is a top horizontal view of the moveable half portion of the injection mold including the present slide retainer shown in FIG. 1;

DESCRIPTION OF THE PREFERRED EMBODIMENT

Figure 8:
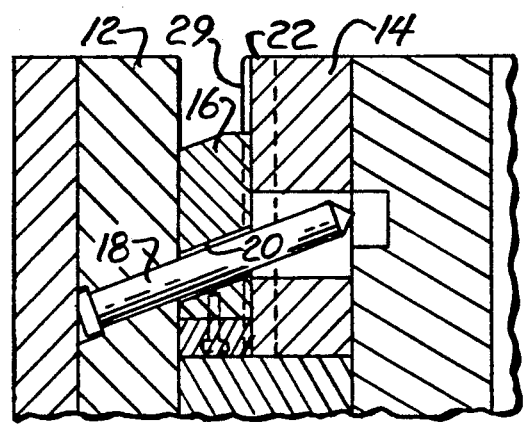

FIGS. 1, 2 and 8 illustrate the present slide retainer installed within a typical injection mold base. The base is of conventional design and includes two halves—a stationary half or "A" plate 12 and a movable half or "B" plate 14 onto which the corresponding mating halves of the actual machined mold (not shown) are mounted. Also depicted is a standard core member slide 16 configured for vertical movement with respect to the mold base, more specifically, for movement upwardly and away from the mold cavities during opening of the mold. A pair of conventional L-shaped slide retainers 17 grip the slide for reciprocal vertical movement therebetween. FIG. 8 illustrates the mold base and slide in the closed position, i.e. the position corresponding to actual molding process.

As is well-known in the injection molding art, the mold halves are separated following each mold cycle to facilitate removal of the molded part therein. With specific reference to the mold of FIG. 8, this opening is occasioned by the rightward lateral movement of the "B" plate 14 with respect to the stationary "A" plate 12.

Figure 4:
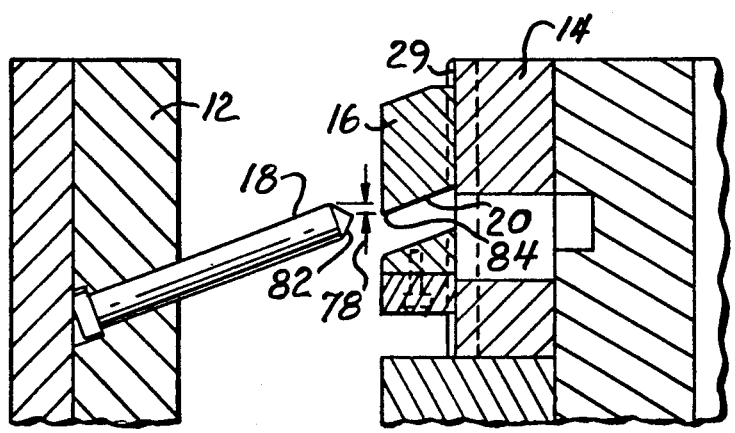
FIG. 4 is a side elevation view of the slide retainer and mold taken in section along line 3—3 of FIG. 1 shown in the full open position of the mold cycle in which the slide is positively locked by the present retainer against release.

Slide 16 reciprocates between its fully lowered or part-mold position as shown in FIG. 8 and its fully raised or retracted and locked mold-open position. The latter position is best seen in FIG. 4. Movement of the slide between these two extreme positions is effected through use of one or more conventional base-mounted angle pins 18 and cooperating slide angle pin holes 20. More specifically, the angle pins extend from the stationary "A" plate at an angle (i.e. not normal to the "A" plate surface) into the similarly angled slide holes 20. As the mold is opened, i.e. upon the rightward movement of the "B" plate, slide 16 is forced upwardly according to the position of the slide along the upwardly sloped angle pins. This upward movement continues until disengagement of the angle pins 18 from the slide (e.g. FIG. 5).

The retainer of the present invention is comprised of two mating insert assemblies referred to herein as the track channel and cylindrical inserts 22 and 24, respectively. The first or track channel insert 22 is preferably mounted, for example by bolts 26, within a recess 28 formed within the "B" plate 14 (FIGS. 1 and 2). The channel insert 22 may be recessed below the surface of the "B" plate 14 thereby facilitating the sliding reciprocal movement of slide 16 on such plate adjacent to, or over, the channel insert itself. In this manner the channel insert 22 may be located within a portion of the "B" plate on which the slide ordinarily and otherwise rides during slide movement thereby providing the slide retention function but without the requirement for additional mold base plate material.

Alternatively, the channel insert may extend above or outwardly from the surface of the "B" plate as shown in the figures to form a longitudinal ridge 29 thereby serving as a guide bar for slide 16, in turn, obviating these generally costly components otherwise required for quality molds designs.

In similar fashion, the second or cylindrical insert 24 is flush-mounted within a recess 30 formed in the adjacent, opposed surface of slide 16. A track pin 32 is rigidly affixed to this insert 24 and extends therefrom into a channel 34 formed within the channel insert 22. As detailed below, it is the engagement of the track pin 32 with the track channel 34 that serves to positively lock slide 16 in its withdrawn position.

Figure 6:
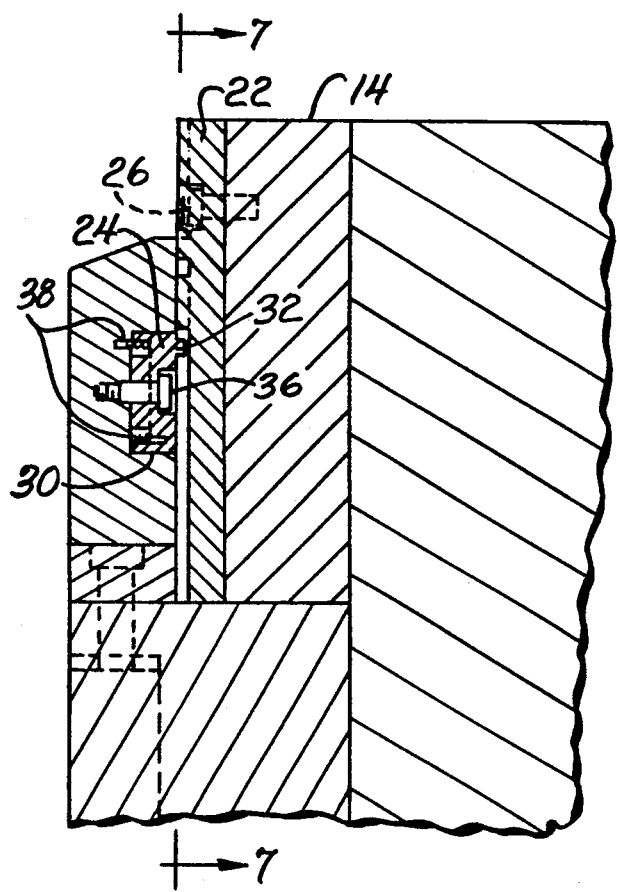
FIG. 6 is a side elevation view taken in section along line 6—6 of FIG. 1.
Figure 7:
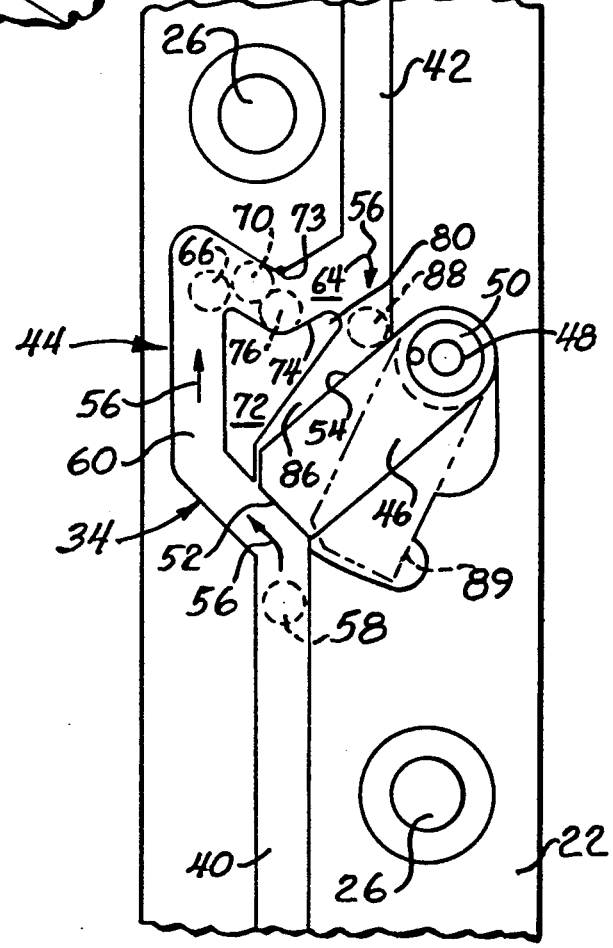
FIG. 7 is a sectional view take along line 7—7 of FIG. 6 illustrating the track insert and further illustrating the position of the track pin at various points through the mold cycle; and, FIG. 8 is a side elevation view taken in section along line 3—3 of FIG. 1 with the mold shown in its fully closed or mold position.

The cylindrical insert 24 is retained by a shoulder bolt 36 for rotational movement about its longitudinal axis. A torsional spring 38 biases insert 24, with pin 32 eccentrically mounted thereon, for clockwise rotation, that is, clockwise as viewed from the track pin 32 looking rightward (FIG. 6) toward the mating channel 34. FIG. 7 pictures the channel 34 as seen by this clockwise biased track pin 32. Moreover, as pin 32 is mounted above the rotational axis of the cylindrical insert 24, the clockwise rotational bias acting upon the cylindrical insert translates into a force always urging the track pin against the right side of the track channel.

As best seen in FIG. 7, the track pin channel 34 is comprised of lower and upper straight channel segments 40 and 42, respectively, interconnected by a heart-shaped circumferential channel segment 44, which segment functions as explained hereinafter to positively retain the slide 16 when in its retracted or mold-open position. A unidirectional flapper gate 46 is pivotally mounted at 48 and is urged, by a second torsional spring 50, into a channel blocking position as illustrated (FIGS. 1 & 7). As thusly positioned, the lower edge 52 of gate 46 precludes entry of an upwardly traveling track pin into the right-hand arm of the circumferential channel segment 44. On the other hand, it will be appreciated that a downwardly traveling track pin, upon contact with the upper gate edge 54, will force the pivotal rotation of gate 46, permitting the essentially unrestrained downward passage of the pin thereby. This uni-directional flapper gate, in combination with the clockwise rotational biasing of the track pin, accounts for and guarantees the proper uni-directional, clockwise movement of the track pin through circumferential channel segment 44. Arrows 56 (FIG. 7) illustrate the direction of track pin travel through channel segment 44.

During the molding of each piece part, the mold is in the closed position shown in FIG. 8, with the track pin 32, which extends from its slide-mounted insert, being found in the lower channel segment 40, below the point of intersection with the adjoining one-way circumferential track segment 44 a distance determined by the amount of slide travel required. The mold closed position of the pin is depicted at 58 of FIG. 7.

As the mold begins to open, that is, as the "B" base plate commences its rightward movement which, in turn, results in the previously discussed upward movement of the slide, track pin 32 undertakes a corresponding upward movement commencing from its initial position in the lower channel segment 40 and continuing until the track pin reaches the circumferential portion 44 of the channel. Although the clockwise bias imparted to the cylindrical insert causes the track pin to engage the right channel sidewall, flapper gate 46 blocks entry of pin 32 into the right-hand arm of the circumferential channel segment and, consequently, pin 32 enters the left-hand arm 60—traveling upwardly in the direction of arrow 56.

Figure 3:
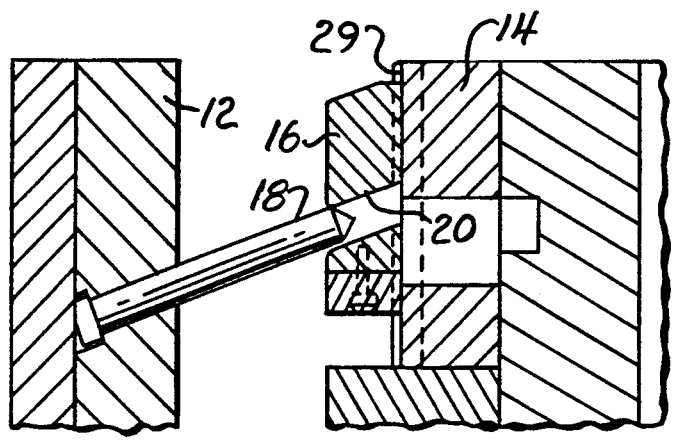
FIG. 3 is a side elevation view of the slide retainer and mold taken in section along line 3—3 of FIG. 1 illustrating the slide at its maximum vertical elevation both during the mold opening and mold closing phases of each mold cycle.

FIG. 3 illustrates the maximum upward point of travel of slide 16, a point defined by the imminent and complete withdrawal of the angle pins 18 from holes 20. The length of the left-hand arm 60 is advantageously selected such that, just prior to reaching the above-described maximum travel point, the track pin clears the left-arm, at ridge 62, and is free to enter the generally horizontal top portion 64 of the circumferential channel segment—under the clockwise rotational bias imparted thereon. Numeral 66 (FIG. 7) shows the pin position as it clears ridge 62 and is thereby released from the left-hand arm 60 into this horizontal portion 64 of the channel.

Importantly, the horizontal channel portion 64 is, as noted, heart-shaped having a lowered region 73 in the center thereof (FIG. 7). As a consequence of this channel topology, the track pin is not free to travel the full horizontal extent of the top channel portion 64 but, instead, engages and comes to a momentary rest against the upper channel as illustrated at 70, FIG. 7. Indeed, the vertical dimension between the top of ridge 62 and the upper wall of the channel at its lowered midpoint 73 may be selected to be less than the diameter of the track pin 32 thereby further assuring the requisite engagement of the track pin against the upper channel wall. It should be noted, however, that this dimensional criterion does not represent an absolute limit for proper functionality of the present retainer by reason that the track pin—in pivoting from the point of release at 66 to the point of subsequent channel engagement at 70—moves upwardly as well as to the right.

Upon complete disengagement of the angle pins 18 from the slide holes 20, that is, as the "B" plate continues its right-hand travel from the position illustrated in FIG. 3, the slide 16 is released to begin its downward travel.

This travel, however, is quickly arrested by the mass or island 72 defined within the circumferential channel segment 44. This island effectively guarantees positive locking of the slide as the slide cannot be forced downwardly, practically without regard to the weight of the slide or downward force placed thereon. More specifically, the slide drops slightly until the track pin 32 comes to rest within the indentation 74 defined in the top surface of island 72. This indentation results from the previously described dip in the center of the heart-shaped horizontal channel portion 64. Numeral 76 (FIG. 7) illustrates the location of the track pin upon the locking retention of the slide by the retainer of the present invention. FIG. 4 further illustrates this locking retention following the complete withdrawal of the angle pins 18 from slide holes 20. Also shown in FIG. 4, as dimension 78, is the slight drop in slide position (as compared to its maximum elevated position of FIG. 3), again, corresponding to the positioning of the track pin at 76 (FIG. 7).

Referring again to FIG. 7, it will be apparent that the generally horizontal channel portion 64 slopes upwardly to the right from its mid-point (i.e. pin location 76) thereby forming a ridge 80 along the upper edge of island 72. This ridge functions to inhibit the egress of the track pin 32 from the horizontal portion of the channel until closure of the mold and the corresponding deliberate release of the slide by the retainer of the present invention. In the absence of ridge 80, there is an increased possibility that the track pin—by reason of the clockwise or rightward bias imparted thereto—could prematurely complete its passage through the horizontal channel portion 64 thereby defeating the positive locking afforded by island 72. Ridge 80, however, need not extend upwardly as far as the corresponding entrance ridge 62 and may advantageously be of reduced height to facilitate slide release.

Figure 5:
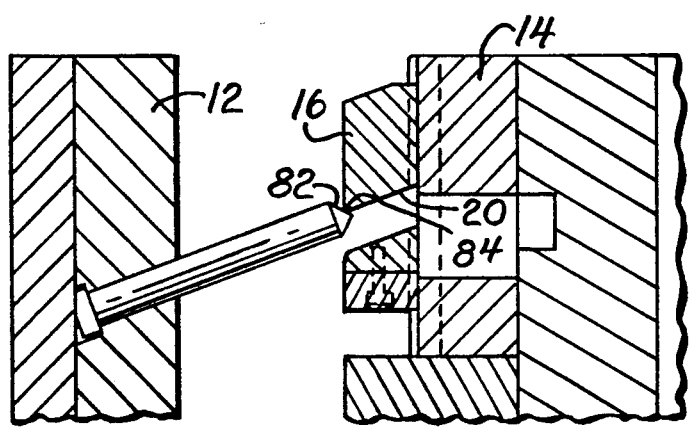
FIG. 5 is a side elevation view of the slide retainer and mold taken in section along line 3—3 of FIG. 1 immediately upon contact of the angle pins and slide during closure of the mold.

Upon commencement of the next mold cycle, i.e. closure of the mold, the "B" plate tracks to the left toward engagement with the stationary half of the mold base, i.e. the "A" plate. FIG. 5 illustrates the relationship between the mold halves the instant of first contact of the angle pins 18 with slide 16. As previously discussed, it will be observed that the slide rests at a point slightly below it maximum vertical travel. Thus, and as is apparent from FIG. 5, an interference exists between the laterally advancing slide 16 (on the leftward moving "B" plate) and the stationary angle pins 18. This interference is importantly linked to the release of the slide as set forth hereinafter.

Specifically, the upper tip edges 82 of the angle pins 18 function as a camming surfaces against which the corresponding upper edges 84 of the slide holes 20 ride as the slide is forced into increasing engagement with the angle pins. This camming action causes the concomitant lifting of the slide and continues until the slide reaches its maximum vertical travel point, again as depicted in FIG. 3. To effect the desired camming action, the upper tip edges 82 of the angle pins must have a positive or rising slope as seen by the advancing slide 16. This slope may be of a curvilinear or spherical nature or it may define the beveled or linear contour of the tips depicted in the figures.

Referring again to FIG. 7, the above-noted lifting of the slide results in the corresponding upward travel of the track pin 32 within the horizontal portion of the circumferential channel. However, coincident with the upward movement of the track pin (i.e. from its point of locked engagement at 76), indeed, as a direct result of such movement, the track pin—under the torsional biasing force placed on the cylindrical insert 24—advances to the right, now clearing the ridge 80 of island 72 thereafter entering into the substantially vertical portion of the circumferential channel which defines the right arm 86 thereof. Numeral 88 depicts the location of the track pin following the above-described passage of the pin from the horizontal channel portion.

At this point the slide is effectively released from the locking action of the present retainer and is free to travel vertically under the direct control of the angle pins 18 within slide holes 20. This travel, as is conventional for such angle pin controlled slides, is, upon the continued closure of the mold, downward and continues until the slide has again reached the lower, fully inserted molding position of FIG. 8. In thusly moving downwardly through the right channel arm 86 it must again be noted that the track pin 32 must engage and move past the flapper gate 46, which gate is oriented within that channel arm to prohibit the upward travel of the track pin therethrough. However, as noted, the gate offers no resistance to downward pin movement by reason of the camming action of the pin against the upper gate edge 54 which, in turn, gently pivots the gate to its open position (as shown by the dotted outline 89, FIG. 7)—the torsional spring 50 snapping the gate back to its closed position following pin passage.

The lower and upper straight channel segments 40 and 42 advantageously facilitate the repair and service of the tool by permitting, for example, the upward removal of the slide from the "B" base plate on which it is mounted without disassembly or removal of the retainer itself. The track pin may traverse the upper channel segment 42 thereby permitting the lifting and removal of the slide. The retainer insert components remain fully installed in their respective slide and base plate members. This feature represents a significant advantage over retainer topologies that only require additional or extended base plate material for mounting, but require the removal of the retainer which, otherwise, blocks the sliding release of the slide.

I claim:

1. A slide retainer for an injection mold tool, said tool having a base plate and a slide, the slide retainer including a channel insert having a channel defined therein, and a cylindrical insert having a track pin rigidly affixed thereto; means for rigidly mounting the channel insert to the base plate; means for mounting the cylindrical insert for rotational movement to the slide in opposing relationship to the channel insert whereby the track pin extends from the cylindrical insert into the channel of the channel insert; the channel defining first and second track pin regions corresponding to first slide extended and second slide retracted positions, respectively; the second track pin region including means for releasibly blocking movement of the track pin and slide therefrom; means for releasing the track pin from the blocking means whereby the slide may return to the first mold position.

2. A slide retainer for an injection mold tool, said tool having a base plate and a slide, the slide retainer including a channel insert and a cylindrical insert; the channel insert having a channel defined therein, said channel including first and second upwardly extending arms interconnected at respective lower ends thereof and a third generally horizontal arm disposed between and interconnecting the respective upper ends of the upwardly extending arms thereby defining a circumferential channel path; the cylindrical insert having a track pin rigidly affixed thereto; means for rigidly mounting the channel insert to the base plate; means for mounting the cylindrical insert for rotational movement to the slide in opposing relationship to the channel insert whereby the track pin extends from the cylindrical insert into the channel of the channel insert and whereby the track pin moves within the channel between first slide extended and second slide retracted positions, said positions corresponding to the track pin being oriented generally below the lower ends of the upwardly extending channel arms and in the horizontal arm, respectively; means for guiding the track pin upwardly through the first upward arm and into the generally horizontal arm as the slide is moved between its extended and retracted positions whereby a sidewall of the horizontal channel blocks downward movement of the slide thereby locking the slide in the second retracted position; means for guiding the track pin from the generally horizontal channel arm to the second upward arm whereby the track pin may travel downwardly therein thereby releasing the slide and permitting return of the slide to the first extended position.

3. The slide retainer of claim 2 in which the means for guiding the track pin upwardly through the first upward arm and into the horizontal arm includes unidirectional gate means associated with the second upward arm, said gate means blocking entry and movement of the track pin in the upward direction and admitting entry and movement of the pin in the downward direction.

4. The slide retainer of claim 2 in which the means for guiding the track pin upwardly through the first upward arm and into the horizontal arm includes a torsional spring associated with the cylindrical insert for biasing the track pin of the cylindrical insert for generally horizontal movement whereby the track pin will enter the horizontal channel arm as the slide is moved to the retracted position thereby locking the slide in its retracted position.

5. The slide retainer of claim 4 in which the means for guiding the track pin upwardly through the first upward arm and into the horizontal arm further includes a lowered region in the horizontal channel arm whereby movement of the track pin through the entire length of the horizontal channel arm is blocked thereby precluding entry of the track pin into the second upward arm and assuring the continued locking retention of the track pin and slide in the slide retracted position.

6. A slide retainer for an injection mold tool, said tool having a base plate and a slide, the slide retainer including a channel insert having a channel defined therein, and a cylindrical insert having a track pin rigidly affixed thereto; means for mounting the channel insert within the base plate adjacent the slide whereby no additional base plate material is required and whereby the slide may be removed from the tool without first removing the channel insert; means for mounting the cylindrical insert for rotational movement within the slide in opposing relationship to the channel insert whereby the track pin extends from the cylindrical insert into the channel of the channel insert; the channel defining first and second track pin regions corresponding to first slide extended and second slide retracted positions, respectively; the second track pin region including means for blocking movement of the track pin and slide therefrom and to the first slide position; means for releasing the track pin from the blocking means whereby the slide may return to the first mold position.

7. The slide retainer of claim 6 including an upper channel segment in communication with the first and second channel track pin regions and the top end of the channel insert, the upper channel segment permitting passage of the track pin thereby facilitating the removal of the slide without tool and retainer disassembly.

8. The slide retainer of claim 6 in which the channel insert includes a ridge and the slide includes a recess, the channel insert ridge extending from the base plate into engagement with a mating recess in the slide whereby the channel insert functions further as a guide to precisely direct movement of the slide between its extended and retracted positions.

9. A slide retainer for an injection mold tool, said tool having a base plate and a slide, the slide retainer including a channel insert and a cylindrical insert; the channel insert having a channel defined therein, said channel including first and second upwardly extending arms interconnected at respective lower ends thereof and a third generally horizontal arm disposed between and interconnecting the respective upper ends of the upward arms thereby defining a circumferential channel path, said horizontal arm having an upper wall and a lower wall; the cylindrical insert having an axis of rotation and a track pin rigidly affixed thereto and spaced from the axis of rotation thereof; means for rigidly mounting the channel insert to the base plate; means for mounting the cylindrical insert for rotational movement to the slide in opposed relationship to the channel insert whereby the track pin extends from the cylindrical insert into the channel of the channel insert and whereby the track pin moves within the channel between first slide extended and second slide retracted positions, said positions corresponding to the track pin being oriented generally below the lower ends of the upward channel arms and in the horizontal arm, respectively; means associated with the cylindrical insert for biasing the insert for generally horizontal movement of the track pin affixed thereto; means for guiding the track pin into the first upward arm as the slide is moved from its first extended to its second retracted positions whereupon the biasing means urges the track pin through the horizontal channel arm; blocking means in the horizontal channel arm for restricting the passage of the track pin between the first and second upward arms whereby the track pin remains in the horizontal arm thereby locking the slide in the retracted position.

10. The slide retainer of claim 9 in which the blocking means includes a lowered region in the upper wall and a raised region in the lower wall of the horizontal channel arm, said regions being spaced along the horizontal arm such that the track pin first engages the lowered upper wall region, then, the raised lower wall region whereby the track pin cannot pass from the horizontal channel arm and the slide cannot return to the first extended position until the slide is successively urged downwardly and upwardly thereby respectively releasing the track pin from blocking engagement with said upper and lower wall regions.

* * * * *